United States Patent [19]

Wolcott et al.

[11] Patent Number: 4,757,225
[45] Date of Patent: Jul. 12, 1988

[54] DUAL STACK TACHOMETER/GENERATOR

[75] Inventors: John H. Wolcott, Bristol; David J. Gritter, Racine, both of Wis.

[73] Assignee: Eaton Corporation, Cleveland, Ohio

[21] Appl. No.: 64,720

[22] Filed: Jun. 22, 1987

[51] Int. Cl.⁴ .......................... H02K 21/12; H02K 1/14
[52] U.S. Cl. ...................................... 310/171; 310/216; 310/257
[58] Field of Search .............. 310/171, 164, 194, 257, 310/268, 216, 217, 218, 162, 254

[56] References Cited

U.S. PATENT DOCUMENTS 3,058,019 10/1962 Eisler ................................... 310/164
3,739,206 6/1973 Schwarzmuller-Joch .......... 310/164
4,503,368 3/1985 Sakamoto ............................ 310/216

FOREIGN PATENT DOCUMENTS 1186319 8/1959 France ................................ 310/257

Primary Examiner—Patrick R. Salce
Assistant Examiner—D. L. Rebsch
Attorney, Agent, or Firm—M. L. Union

[57] ABSTRACT

A low cost, linear, low impedance tachometer/generator includes a stator and a rotor. The rotor includes a plurality of magnetic poles which alternate between first and second polarities, and the stator includes a plurality of first and second annular sets of planar laminated poles which are spaced apart, with the first set of poles having a first polarity and the second set of poles having a second polarity. An annular coil is disposed between the first and second sets of poles. The first set of poles is axially spaced apart and circumferentially offset one pole pitch about the axis of rotation from the second set of poles to effect simultaneous periodic alignment of the first set of poles on the stator with the plurality of poles on the rotor of the second polarity and the second set of poles on the stator with the plurality of poles on the rotor of the first polarity.

9 Claims, 1 Drawing Sheet

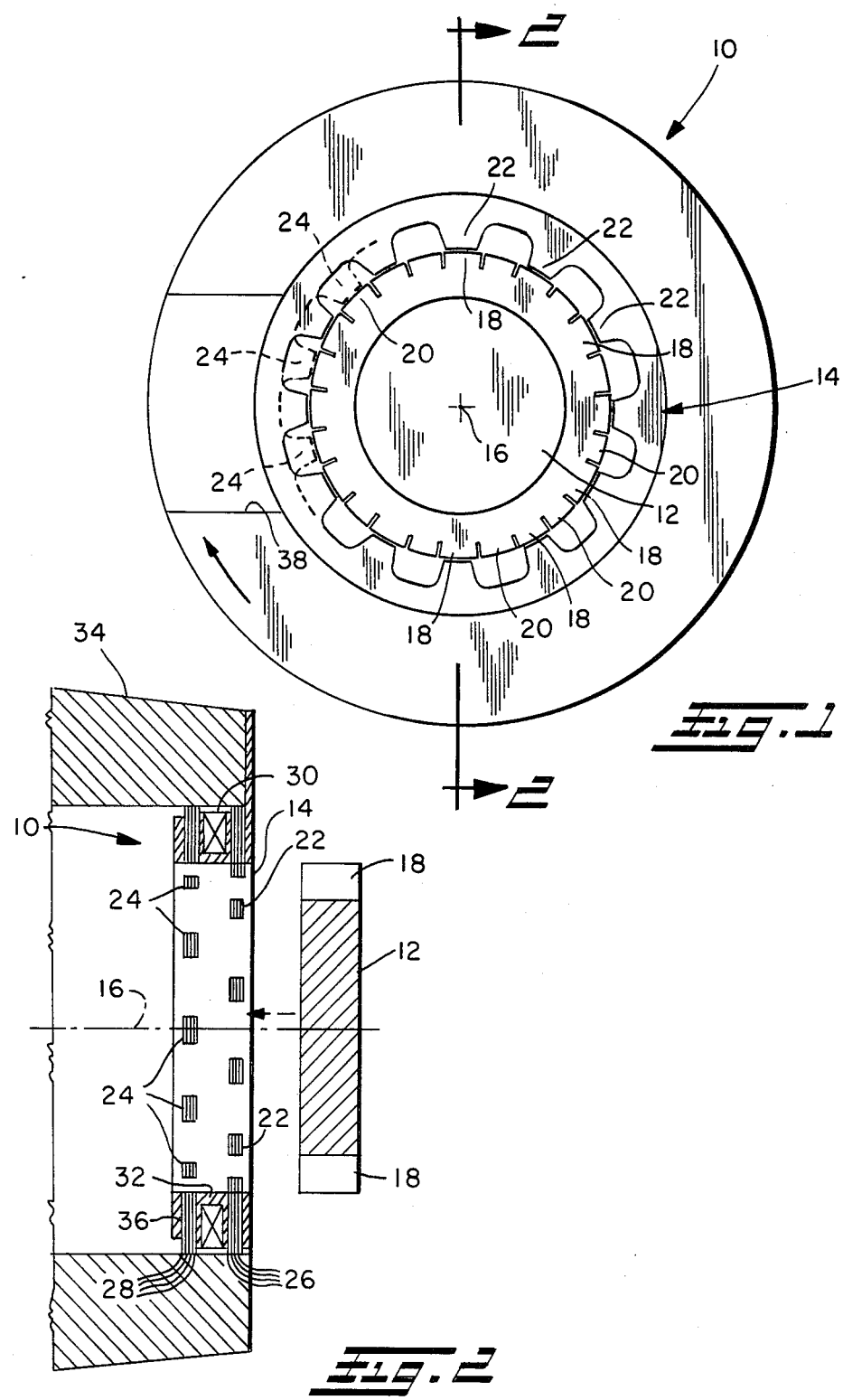

DUAL STACK TACHOMETER/GENERATOR

DESCRIPTION

A low cost, low impedance, tachometer/generator utilizing a single bobbin-wound coil which exhibits improved linearity.

TECHNICAL FIELD

The present invention relates to a tachometer/generator which includes a rotor and a low cost stator including first and second sets of spaced apart stator poles which are formed from laminations and wherein the poles of the first set of laminations are offset one magnetic pole pitch from the poles of the second set of laminations. The rotor includes north and south poles thereon which respectively simultaneously align with the first and second sets of stator poles.

BACKGROUND

Tachometer/generators are well known in the art and are utilized to establish a signal indicative of the relative rotation between the rotor and stator of the tachometer/generator. In known tachometer/generators, complicated skein windings were utilized to provide poles of alternating polarity on the stator. Skein windings are time consuming and expensive. Attempts to provide simplified low cost tachometer/generators have suffered from high output impedance due to the fact that the stator teeth do not simultaneously align over each magnetic pole on the rotor. Additionally, previous designs, which attempted to simplify the structure, resulted in a non-linear output from the tachometer/generator which, in part, was due to eddy current losses in the stator teeth and in the flux return path behind the coil which forms a shorted turn.

DISCLOSURE OF THE INVENTION

The tachometer/generator of the present invention is designed to reduce assembly costs while maintaining a low impedance, reasonably linear output. The tachometer/generator utilizes first and second sets of laminated stator poles wherein one set is offset one magnetic pole pitch from the other set.

The present invention provides a new and improved tachometer/generator including an annular rotor member rotatable about an axis of rotation which includes a plurality of magnetic poles thereon disposed about an annular periphery thereof, the plurality of magnetic poles on the rotor member alternating between a first and a second polarity, stator means including first and second annular sets of poles disposed about said axis of rotation with the first set of poles being of a first polarity and axially spaced apart from and circumferentially offset one pole pitch about the axis of rotation from the second set of poles which are of the second polarity, and annular coil means disposed about the axis of rotation between the first and second sets of poles. The rotor, when rotating relative to the stator, effects simultaneous periodic alignment of the first set of poles on the stator with the plurality of poles on the rotor of the second polarity and the second set of poles on the stator with the plurality of poles on the rotor of the first polarity to establish a flux path around the coil means from the plurality of magnetic poles of the first polarity on the rotor, to the second set of stator poles of the second polarity, through the stator, to the first set of stator poles of the first polarity and back to the rotor poles of the second polarity.

Another provision of the present invention is to provide a new and improved tachometer/generator as set forth in the preceding paragraph wherein the first and second sets of poles on the stator are formed from laminations to minimize eddy current losses in the stator.

Still another provision of the present invention is to provide a new and improved tachometer/generator including a rotor and a stator, the rotor being rotatable relative to the stator for generating a signal in dependence upon the relative rotation of the rotor and the stator about an axis of rotation. The stator includes first and second spaced apart sets of laminations, each of which define stator poles thereon, the stator poles of the first set of laminations being offset about said axis of rotation one pole pitch from the stator poles of the second set of laminations, the poles on the first set of laminations being of a first polarity and the poles on the second set of laminations being of the second polarity, opposite to the first polarity, and a single bobbin wound coil disposed between the first and second sets of laminations for having a signal induced therein in dependence upon the relative rotation of the rotor and the stator.

Still a further provision of the present invention is to provide a new and improved tachometer/generator as set forth in the preceding paragraph wherein the poles on the rotor extend in a radial direction, are disposed about the outer periphery thereof and alternate in polarity between the first and second polarity, with the poles of the first polarity on the rotor periodically coming into alignment with the poles of the second set of laminations of the second polarity, while the poles of the second polarity on the rotor simultaneously align with the poles of the first set of laminations of the first polarity as the rotor rotates.

BRIEF DESCRIPTION OF THE DRAWINGS

FIG. 1 is a planner view of the tachometer/generator assembly of the present invention.

FIG. 2 is a cross sectional view of the tachometer/generator of the present invention taken approximately along the line 2—2 of FIG. 1.

DESCRIPTION OF A PREFERRED EMBODIMENT

Referring to FIG. 1, a tachometer/generator 10 is illustrated. The tachometer/generator 10 includes a rotor 12 and a stator assembly 14. The rotor 12 is rotatable relative to the stator 14 about an axis of rotation 16. The rotor 12 includes a plurality of radially extending poles 18 and 20 thereon which are alternately disposed about the outer periphery of the rotor 12. The rotor is formed from a permanent magnetic material and the poles 18 have a first polarity, while the poles 20 have a second polarity, opposite to the first polarity. For purposes of convention, the poles 18 of the first polarity will be designated north poles and the poles 20 of the second polarity will be designated south poles.

The stator 14 includes a first set of poles 22 having a first polarity and a second set of poles 24 having a second polarity. The first set of poles 22 will, for convention purposes, be designated north poles, and the second set of poles 24 will be designated south poles. The poles 22 and 24 extend radially inwardly from the stator 14 and are disposed adjacent to and face the poles 18 and 20 on the rotor 12. The first and second sets of poles 22 and 24 are spaced apart in an axial direction, as is more fully illustrated in FIG. 2. The first set of poles 22 on the stator 14 is formed from a plurality of laminations 26, and the second set of poles 24 is formed from a plurality of laminations 28. The poles 22 are offset from the poles 24 by one magnetic pole pitch about the axis of rotation 16, as is more fully illustrated in FIG. 1. Offsetting poles 22 from poles 24 allows the rotor poles 18 and 20 to simultaneously align with the poles 22 and 24 on the stator 14, respectively.

A coil 30 extends around the outer periphery of the stator 14 between the first set of laminations 26 and the second set of laminations 28. Preferably, the coil 30 is a one-piece, bobbin wound coil which is integrally molded into a support member 32 which supports the first and second sets of laminations 26 and 28. As the rotor 12 rotates relative to the stator 14, a signal will be induced in coil 30 which is proportional to the relative rotation between the rotor 12 and the stator 14. The simultaneous alignment of magnetic rotor poles 18 with stator poles 22 and magnetic rotor poles 20 with stator poles 24, provides for a significant portion of the magnetic flux established as magnetic poles 18 and 20 rotate to be coupled around coil 30. Thus, the simultaneous alignment of poles 18 and 22, and 20 and 24 minimizes the required number of turns in coil 30 due to the improved configuration which allows the north and south poles on the rotor 12 to simultaneously align with the south and north poles, respectively, on the stator 14, thereby providing a low impedance flux path.

The stator 14 is supported by a support structure 34 which includes an annular chamber 36 therein which receives and supports the stator assembly 14. The support structure 34 is formed from high resistivity iron which acts to complete the magnetic circuit from the stator poles 22 and 24 around the coil 30. The use of high resistivity iron suppresses the build up of eddy currents in the iron around the coil 30, which results in a higher power output from coil 30, due to the fact that power is not dissipated in the iron via eddy current losses. Preferably, the iron of the support member 34 will have a resistivity of at least 40 micro ohms per centimeter. A slot 38 in the support structure 34 allows the power leads, not illustrated, to exit from the coil 30, and prevents excessive shorted turn eddy currents in the support structure 34.

The tachometer/generator 10 of the present invention is designed to reduce costs while maintaining a low impedance, high power output with reasonable linearity. Prior art designs suffer from high output impedance due to the fact that the stator teeth do not simultaneously align over each magnetic pole on the rotor unless a skein or a similar costly winding is utilized, or from a non-linear output due to eddy current losses in the teeth and in the flux return path behind the coil which forms a shorted turn. The use of the laminations 26 and 28 to form the stator poles 22 and 24, which are offset from each other by one magnetic pole pitch, decreases the cost of the tachometer/generator assembly 10 while minimizing tooth loss caused by eddy currents normally associated with solid teeth. The laminations 26 and 28 reduce the eddy current losses.

The use of a simple, low cost, bobbin wound coil 30 provides a distinct advantage over the costly skein windings normally associated with tachometer/generators. The use of a simple bobbin wound coil 30, which is pressed into a high resistivity iron assembly 34, completes the magnetic circuit around the coil 30. The offset of the sets of laminations 26 and 28, which form poles 22 and 24, respectively, by one magnetic pole pitch, couple a significant portion of magnetic flux around the coil 30 to minimize the required number of turns in coil 30 and decrease the impedance of the flux path.

It is contemplated that the construction of the stator laminations 26 and 28 could be modified to bend the poles 22 and 24 inwardly at the end portions thereof towards each other around the coil 30. Such a (clawtooth) modification would capture more of the magnetic flux and reduce the air gap between the stator poles 22 formed on the laminations 26 and the stator poles 24 formed on the laminations 28.

From the foregoing, it should be apparent that a new and improved tachometer/generator 10 assembly has been provided which includes an annular rotor member 12, including a plurality of magnetic poles 18 and 20 thereon disposed about an annular periphery thereof. The plurality of magnetic poles 18 and 22 on the rotor 12 alternate between a north and south polarity, with the poles 18 having a north polarity and the poles 20 having a south polarity. A stator means 14 includes first and second annular sets of poles 22 and 24 disposed thereon about the axis of rotation 16. The first set of poles 22 is axially spaced apart from and circumferentially offset from the second sets of poles 14 one full pitch about the axis of rotation from the second set of poles 24. An annular coil 30 is disposed about the axis of rotation. When the rotor 12 rotates, simultaneous periodic alignment of the poles 22 on the stator 14 with the poles 18 on the rotor 12 and the poles 24 on the stator 14 with the poles 20 on the rotor 12 occur. The rotor 12 when rotating relative to the stator 14 establishes a flux path from the plurality of magnetic poles 18 to the plurality of stator poles 22, through the stator 14 and high resistivity iron support member 34 therefor to the stator poles 24 and back to the rotor poles 20. The lines of flux in the flux path are maximized when the magnetic poles 18 on rotor 12 align with poles 22 on the stator 14 and the magnetic poles 20 on the rotor align with the stator poles 24 to lower the impedance of the flux path.

What we claim is:

1. A tachometer/generator comprising an annular rotor member rotatable about an axis of rotation, said rotor member including a plurality of magnetic poles thereon disposed about an annular periphery thereof, said plurality of magnetic poles on said rotor member alternating between a first and a second polarity, stator means including first and second annular sets of poles thereon disposed about said axis of rotation, said first set of poles being axially spaced apart from and circumferentially offset one pole pitch about said axis of rotation from said second set of poles, annular coil means disposed about said axis of rotation between said first and second sets of poles, said first set of poles having a first polarity and said second set of poles having a second polarity, opposite said first polarity, said rotor when rotating effecting simultaneous periodic alignment of said first set of poles on said stator means with said plurality of poles on said rotor of said second polarity and said second set of poles on said stator means with said plurality of poles on said rotor of said first polarity, said rotor when rotating relative to said stator means establishing a flux path from said plurality of magnetic poles thereon of said first polarity, to said plurality of stator poles of said second polarity, through said stator means, to said stator poles of said first polarity and back to said rotor poles of said second polarity, and wherein the reluctance in said flux path is minimized when said magnetic poles on said rotor of said first polarity align with said second set of poles of said stator means and said magnetic poles on said rotor of said second polarity align with said first set of poles on said stator means, said first and second sets of poles being each formed from a plurality of parallel planar laminations which extend in a radial direction from said axis of rotation, said laminated sets of poles minimizing eddy current tooth loss to linerize the voltage induced in said coil with respect to the speed of relative rotation of said rotor and stator means.

2. A tachometer/generator as is defined in claim 1 further including an annular support means for supporting first and second sets of poles about said axis of rotation, said annular support means being formed from a material having a high resistivity to minimize the build up of eddy currents in said annular support means, said annular support means including an axially extending discontinuous portion thereof to minimize the circulation of shorted turn induced currents around the circumference of said annular support means.

3. A tachometer/generator as defined in claim 2 wherein said axially extending discontinuous portion of said annular support means comprises a axially extending slot through which electric energy is removed from said coil and which prevents the circulation of shorted turn induced currents around the circumference of said annular support means.

4. A tachometer/generator as is defined in claim 1 wherein said annular coil means comprises a bobbin wound coil.

5. A tachometer/generator comprising a rotor and stator means, said rotor being rotatable about an axis of rotation relative to said stator means for generating a signal in dependence upon the relative rotation of said rotor and said stator means about an axis of rotation, said stator means including first and second axially spaced apart sets of substantially parallel planar laminations each of which defines stator poles thereon, and each of which laminations extends in a radial direction, said stator poles on said first set of laminations being offset about said axis of rotation one pole pitch from said stator poles on said second set of laminations, said poles on said first set of laminations being of a first polarity and said poles on said second set of laminations being of a second polarity opposite to said first polarity, a single bobbin wound coil disposed between said first and second sets of laminations for having a signal induced therein in dependence upon the relative rotation of said rotor and said stator means, said rotor including a plurality of poles thereon which are adapted to align with said poles on said laminations.

6. A tachometer/generator as is defined in claim 5 wherein said poles on said rotor extend in a radial direction, are disposed about the outer periphery thereof and alternate in polarity between said first and second polarity, said poles of said first polarity on said rotor periodically coming into alignment with said poles on said second set of laminations of said second polarity while said poles of said second polarity on said rotor simultaneously align with said poles on said first set of laimiantions of said first polarity as said rotor rotates relative to said stator means.

7. A tachometer/generator as in defined in claim 6 further including an annular support means for supporting said stator poles on said first and second sets of laminations about said axis of rotation, said annular support means being formed from a material having a high resistivity to minimize the build up of eddy currents in said annular support means, said annular support means including an axially extending discontinuous portion thereof to minimize the circulation of shorted turn induced currents around the circumference of said annular support means.

8. A tachometer/generator as is defined in claim 5 further including an annular support means for supporting said first and second sets of laminations about said axis of rotation, said annular support means being formed from a material having a high resistivity to minimize the build up of eddy currents in said annular support means.

9. A tachometer/generator as is defined in claim 7 wherein said discontinuous portion of said annular support means comprises an axially extending slot through which electric energy is removed from said coil and which prevents the circulation of shorted turn induced currents around said annular support means.

* * * * *